(12) United States Patent
Kim et al.

(10) Patent No.: US 8,520,488 B2
(45) Date of Patent: Aug. 27, 2013

(54) OPTICAL PICKUP DEVICE THAT FORMS AN OVAL SPOT ON A DISC HAVING A SMALL ANGLE WITH RESPECT TO A RADIAL AXIS

(75) Inventors: Ui-yol Kim, Suwon-si (KR); Yong-jae Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/179,603

(22) Filed: Jul. 11, 2011

(65) Prior Publication Data

US 2012/0082021 A1  Apr. 5, 2012

(30) Foreign Application Priority Data

Sep. 30, 2010  (KR) .................. 10-2010-0095398

(51) Int. Cl.
  *G11B 7/00* (2006.01)
(52) U.S. Cl.
  USPC ..................................... 369/112.24
(58) Field of Classification Search
  None
  See application file for complete search history.

(56) References Cited

U.S. PATENT DOCUMENTS

| | | | |
|---|---|---|---|
| 2002/0110076 A1* | 8/2002 | Yanagisawa | 369/112.24 |
| 2004/0042358 A1 | 3/2004 | Ito | |
| 2011/0044155 A1* | 2/2011 | Kim et al. | 369/112.23 |

FOREIGN PATENT DOCUMENTS

| | | |
|---|---|---|
| JP | 2006-120235 A | 5/2006 |
| KR | 10-2006-0050000 | 5/2006 |
| KR | 10-2008-0099114 | 11/2008 |

OTHER PUBLICATIONS

Korean Office Action issued Jan. 14, 2013 in counterpart Korean Application No. 10-2010-0095398; (3 pages, in Korean).

* cited by examiner

*Primary Examiner* — Paul Huber
(74) *Attorney, Agent, or Firm* — NSIP Law

(57) ABSTRACT

An optical pickup device, an optical drive using the same, and a method of forming a beam spot are provided. The optical pickup includes a light source system that includes a light source corresponding to at least one of a digital versatile disc (DVD) and a Blu-ray disc (BD). The light source forms a beam spot having an oval shape with a long axis and a short axis on an information recording track of the disc, and the light source is disposed such that the long axis is maintained at an angle ranging from 0° to 30° with respect to a radial direction passing through a rotation center of the disc.

11 Claims, 9 Drawing Sheets

<ROS>

<DOS>

<TOS>

<ROS>

<DOS>

OPTICAL PICKUP DEVICE THAT FORMS AN OVAL SPOT ON A DISC HAVING A SMALL ANGLE WITH RESPECT TO A RADIAL AXIS

CROSS-REFERENCE TO RELATED APPLICATION(S)

This application claims the benefit under 35 U.S.C. §119 (a) of Korean Patent Application No. 10-2010-0095398, filed on Sep. 30, 2010, in the Korean Intellectual Property Office, the entire disclosure of which is incorporated herein by reference for all purposes.

BACKGROUND

1. Field

The following description relates to an optical pickup device, and more particularly, to an optical pickup device that may reduce interference between pits and interference between adjacent tracks in a direction of a long axis of a beam spot. The following description also relates to a method of forming a beam spot by using the optical pickup device.

2. Description of the Related Art

A beam spot incident on a disc in an optical pickup device has a substantially oval shape with a long axis and a short axis. The beam spot is formed along a groove located between lands between tracks of the disc, and edges of the beam spot along the long axis are to be formed on the groove. A direction of the long axis of the beam spot should be appropriately adjusted in order for adjacent tracks and pits in each track to not interfere with the beam spot. Accordingly, when designing an optical pickup device for high density discs, for example, digital versatile discs (DVDs), a direction of a long axis of a beam spot should be appropriately determined in order to obtain a stable and high quality signal.

SUMMARY

In one general aspect, there is provided an optical pickup device including an optical system including a light source corresponding to at least one of a digital versatile disc (DVD) and a Blu-ray disc (BD), a light-receiving system configured to receive light reflected from the disc to generate an electrical signal, and a light-transmitting system including an objective lens facing the disc and a collimating lens disposed behind the objective lens, and is configured to guide light emitted from the light source to the disc and guide light reflected from the disc to the light-receiving system. The light source forms a beam spot having an oval shape with a long axis and a short axis on an information recording track of the disc, and the light source is disposed such that the long axis is maintained at an angle ranging from 0° to 30° with respect to a radial direction passing through a rotation center of the disc.

When a magnification ratio of light transmission Mr is defined as Mr=fc/fo, where fc is a focal length of the collimating lens and fo is a focal length of the objective lens, the magnification ratio of light transmission Mr for the DVD ranges from 5.5 to 6.5 and the magnification ratio Mr of light transmission for the BD ranges from 9 to 12.

Sizes of the beam spot formed on the disc in the radial direction and a tangential direction may range from 0.500 to 1.00 μm.

The optical system may include a light source for BDs, wherein a coupling lens for reducing an optical distance may be disposed between the light source for BDs and the collimating lens.

In another aspect, there is provided an optical drive including an optical pickup device including an optical system. The optical pickup system includes a light source corresponding to at least one of a DVD and a BD, a light-receiving system configured to receive light reflected from the disc to generate an electrical signal, and a light-transmitting system including an objective lens facing the disc and a collimating lens disposed behind the objective lens, and is configured to guide light emitted from the light source to the disc and guide light reflected from the disc to the light-receiving system. The light source forms a beam spot having an oval shape with a long axis and a short axis on an information recording track of the disc, and the light source is disposed such that the long axis is maintained at an angle ranging from 0° to 30° with respect to a radial direction passing through a rotation center of the disc. The optical drive also includes a mechanical system configured to support the optical pickup device and an information processor configured to process an electrical signal from the optical pickup device.

When a magnification ratio of light transmission Mr is defined as Mr=fc/fo, where fc is a focal length of the collimating lens and fo is a focal length of the objective lens, the magnification ratio of light transmission Mr for the DVD ranges from 5.5 to 6.5 and the magnification ratio of light transmission Mr for the BD ranges from 9 to 12.

Sizes of the beam spot formed on the disc in the radial direction and a tangential direction may range from 0.500 to 1.00 μm.

The optical system may include a light source for BDs, wherein a coupling lens for reducing an optical distance may be disposed between the light source for BDs and the collimating lens.

In another aspect, there is provided a method of forming a beam spot of an optical pickup device, the method including generating, by the optical pickup device, a beam having an oval shape with a long axis and a short axis directed toward a disc and forming, by the optical pickup device, a beam spot by focusing the beam on an information recording track of the disc, wherein the long axis is maintained at an angle ranging from 0° to 30° with respect to a radial direction passing through a rotation center of the disc.

When a magnification ratio of light transmission Mr is defined as Mr=fc/fo, where fc is a focal length of a collimating lens and fo is a focal length of an objective lens, the magnification ratio of light transmission Mr for a DVD ranges from 5.5 to 6.5 and the magnification ratio of light transmission Mr for a BD ranges from 9 to 12, Sizes of the beam spot formed on the disc in the radial direction and a tangential direction may range from 0.500 to 1.00 μm.

The optical system may include a light source for BDs, wherein a coupling lens may be disposed between the light source for BDs and the disc and reduce an optical distance between the light source for BDs and the disc.

In another aspect, there is provided an optical pickup device including an optical system comprising a light source corresponding to at least one of a first type of optical storage medium and a second type of optical storage medium, a light-receiving system configured to receive light reflected from the medium to generate an electrical signal, and a light-transmitting system comprising an objective lens facing the medium and a collimating lens disposed behind the objective lens, and is configured to guide light emitted from the light source to the medium and guide light reflected from the medium to the light-receiving system. The light source forms a beam spot having an oval shape with a long axis and a short axis on an information recording track of the medium, and the light source is disposed such that the long axis is maintained at an angle ranging from 0° to 30° with respect to a radial direction passing through a rotation center of the medium.

Other features and aspects may be apparent from the following detailed description, the drawings and the claims.

Figure 1:
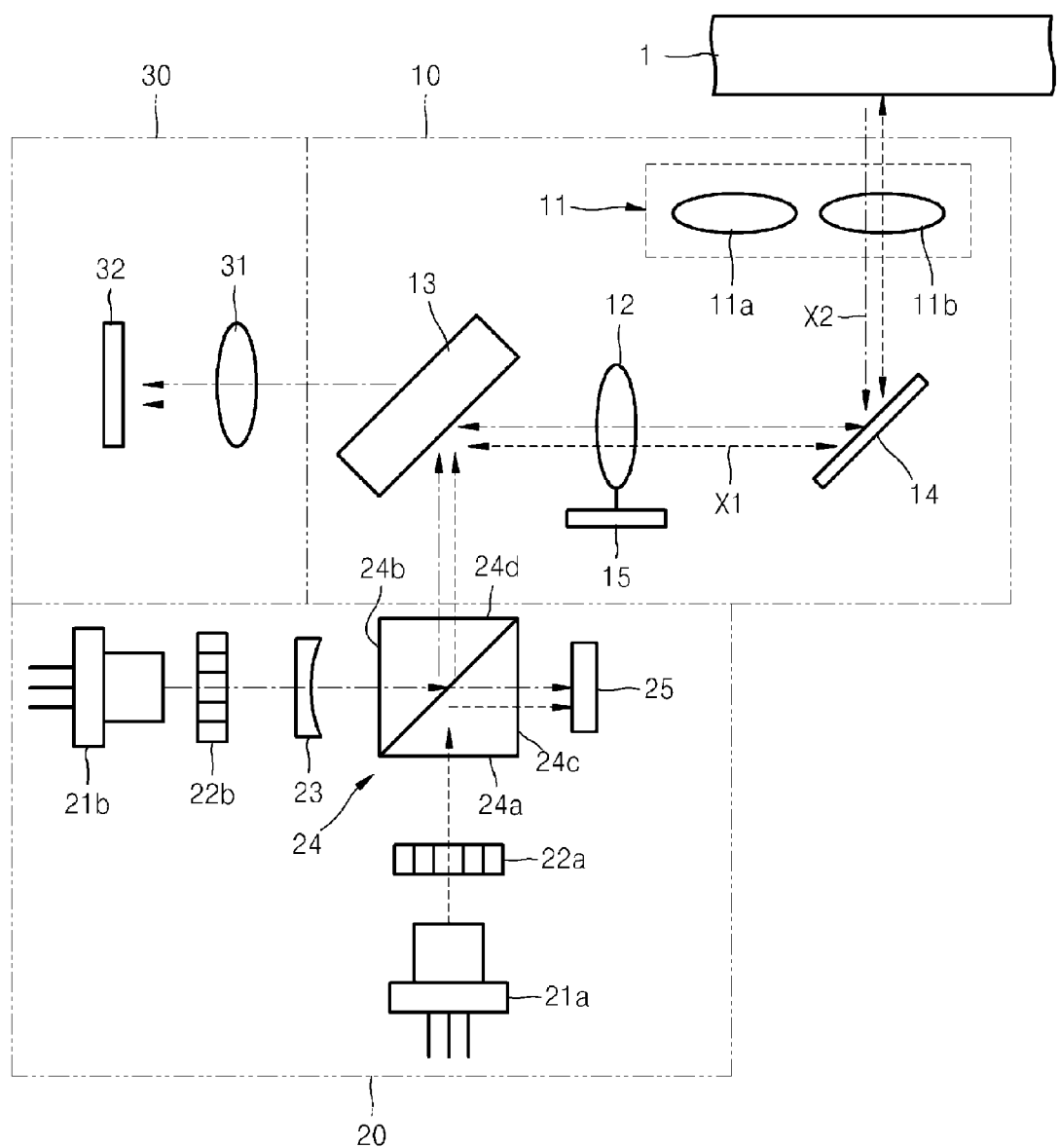
FIG. 1 is a diagram illustrating an example of a structure of an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a structure of an optical pickup device compatible with a plurality of media such as a compact disc (CD), a Blu-ray disc (BD), and a digital versatile disc (DVD).

The optical pickup device includes a light-transmitting system (also referred to as a focusing optical system) 10 that directly corresponds to a disc 1, a light source system 20 that supplies light for reproducing and/or recording information from/to the disc 1, and a light-receiving system 30 that receives light reflected from the disc 1 and generates an electrical signal to reproduce information.

The light-transmitting system 10 includes an objective lens assembly 11 corresponding to the disc 1, a first beam splitter 13 having a plate-shaped structure, and a collimating lens 12 disposed between the objective lens assembly 11 and the first beam splitter 13. The collimating lens 12 may be moved to a preset position by a transport device 15 to obtain an appropriate focal length according to a type of the disc 1. The objective lens assembly 11 includes first and second objective lenses 11a and 11b which correspond to a plurality of discs. The first objective lens 11a corresponds to CDs and DVDs, and the second objective lens 11b corresponds to BDs. The first and second objective lenses 11a and 11b are disposed in parallel to the disc 1, and share an optical axis X2 that is perpendicular to an optical axis X1 of the light-transmitting system 10. An optical path travels along both the optical axis X1 and the optical axis X2 by being altered by an optical path changing mirror 14. The objective lens assembly 11 makes a reciprocating motion such that the first objective lens 11a or the second objective lens 11b is located on the optical axis X2 according to the type of the disc 1. The first beam splitter 13 reflects light emitted from the light source system 20 to the disc 1, and transmits light reflected from the disc 1 to the light-receiving system 30. The light-receiving system 30 includes a photodetector 32 on which light reflected from the disc 1 is incident and a sensing lens 31 that condenses the light to an appropriate size on the photodetector 32.

The light source system 20 includes a plurality of light sources corresponding to a plurality of discs. For example, the light source system includes a first light source 21a for CDs and DVDs and a second light source 21b for BDs. The first light source 21a and the second light source 21b emit light toward first and second incident surfaces 24a and 24b of a second beam splitter 24 having a cubic structure. A coupling lens 23 for adjusting an optical magnification (i.e., a defocused amount of proceeding light) is disposed between the second light source 21b and the second beam splitter 24. The second beam splitter 24, which receives light from the second light source 21b, includes the two adjacent incident surfaces 24a and 24b and adjacent second and first emitting surfaces 24c and 24d. Most of the light incident on the two incident surfaces 24a and 24b from the first and second light sources 21a and 21b proceeds through the first emitting surface 24d to the first beam splitter 13. A first diffraction element (grating) 22a for CDs and DVDs and a second diffraction element (grating) 22b for BDs each generate a main beam, a positive (+) first order sub-beam, and a negative (−) first order sub-beam. The first and second diffraction elements 22a, 22b are disposed between the beam splitter 24 and the first and second light sources 21a and 21b. A distance between a main beam and a sub-beam generated by a diffraction element varies according to a grating interval of the diffraction element. Meanwhile, a monitor photodetector 25 for detecting a part of light emitted from the second beam splitter 24 is disposed in front of the second emitting surface 24c of the second beam splitter 24. Alternatively, the monitor photodetector 25 may be disposed at a side of the first beam splitter 13.

The coupling lens 23 is disposed between the second light source 21b and the second incident surface 24b, and adjusts an optical distance between the second light source 21b and the disc 1 such that light from the second light source 21b is incident at an appropriate angle on the collimating lens 12. The coupling lens 23 for correcting aberration of the collimating lens 12 according to the type of the disc 1 is configured to reduce divergence of the collimating lens 12 at a reference position when being used for a BD.

The example of the optical pickup device constructed as described above may be used for CDs, DVDs, and BDs. A position of the collimating lens 12 on the optical axis may be adjusted, and in particular, if necessary, the optical pickup device may be more effectively used for BDs by using the coupling lens 23 having negative power.

Figure 2:
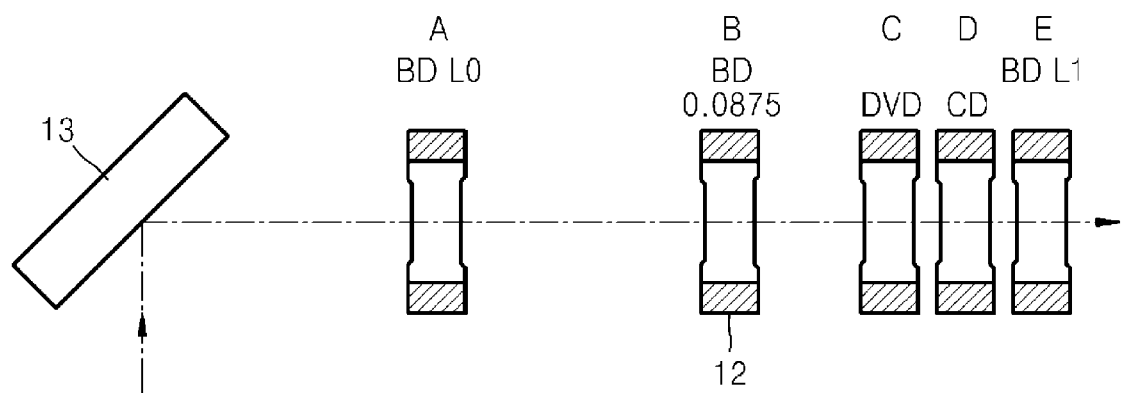
FIG. 2 is a diagram illustrating an example of relative positions of a collimating lens on an optical axis based on the type of disc to be written to/read from in the optical pickup device of FIG. 1.

FIG. 2 illustrates an example of relative positions of the collimating lens 12 based on the type of disc that is be written to or read from. The collimating lens 12 is located on a path of light reflected from the first beam splitter 13. That is, the collimating lens 12 is located on the optical axis X1 of the light-transmitting system 10. In FIG. 2, 'B' indicates an initial position corresponding to a BD having a thickness of 0.0875 mm, 'A' is a position corresponding to a first layer L0 of the BD, 'C' is a position corresponding to a DVD, 'D' is a position corresponding to a CD, and 'E' is a position corresponding to a second layer L1 of the BD. That is, an optimal focus is obtained by adjusting a position of the collimating lens 12 disposed on the optical axis X1 as shown in FIG. 2 according to types and layers of discs. Accordingly, an optimal focus may be obtained according to the position of the collimating lens 12. Meanwhile, optical characteristics of the coupling lens 23 reduce an overall optical distance as is explained below with reference to FIG. 3.

Figure 3:
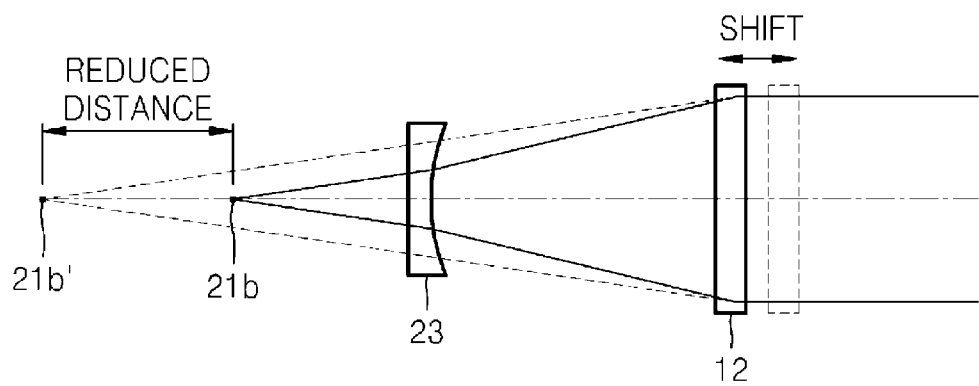
FIG. 3 is a diagram illustrating an example of a reduction in an optical distance when a coupling lens exists in the optical pickup device of FIG. 1.

FIG. 3 illustrates a reduction in an optical distance when the coupling lens 23 exists in a BD optical system. The coupling lens 23 is disposed next to the second light source 21b, that is, after a light source for BDs, has negative power. The coupling lens 23 allows an overall optical distance to be reduced and sensitivity in a movement distance of the collimating lens 12 to be reduced. In FIG. 3, 21b' denotes a position of a light source when the coupling lens 23 does not exist, and 21b denotes a position when the coupling lens 23 exists. As such, the overall optical distance may be reduced, and a movement distance of the collimating lens 12 along the axis may be reduced. A rate K of the reduction in the amount of movement of the collimating lens 12 may be expressed as follows.

$$K = \left(\frac{F2}{F3}\right)^2 \quad \text{[Equation 1]}$$

where:
F1 refers to a focal length of the coupling lens 23;
F2 refers to a focal length of the collimating lens 12; and
F3 refers to a combined focal length of F1+F2.
The following optical result may be obtained from these optical elements having the following focal lengths.
F1: −13.4 mm
F2: 11.56 mm
F3: 14.5 mm
K=0.64

This result, in this example, shows that under the same focal length condition, the amount of movement of the collimating lens 12 when the coupling lens 23 is used together with the collimating lens 12 is 0.64 times lower than the amount of movement of the collimating lens 12 when only the collimating lens 12 is used.

Figure 4:
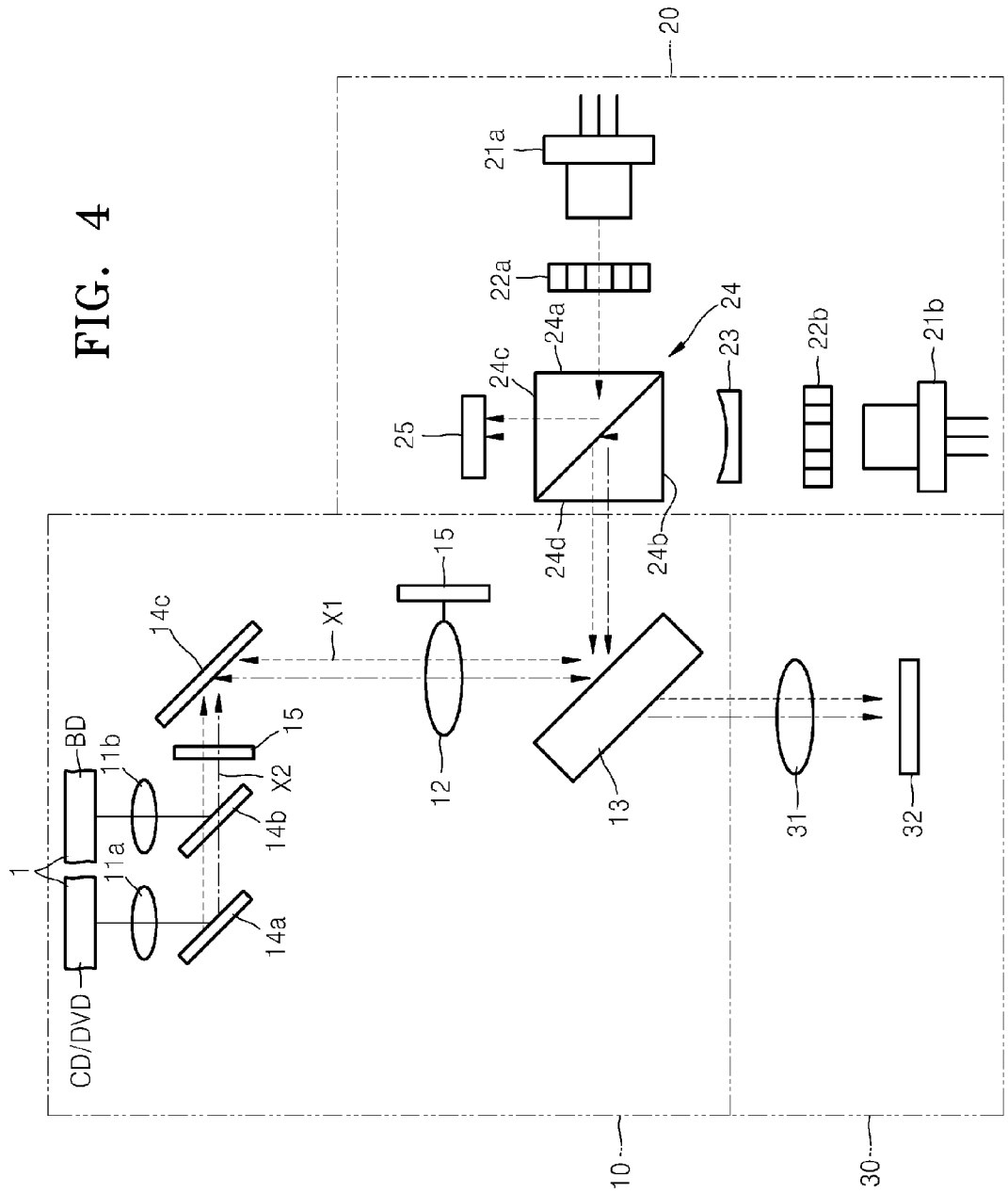
FIG. 4 is a schematic diagram illustrating another example of an optical pickup device.
Figure 5:
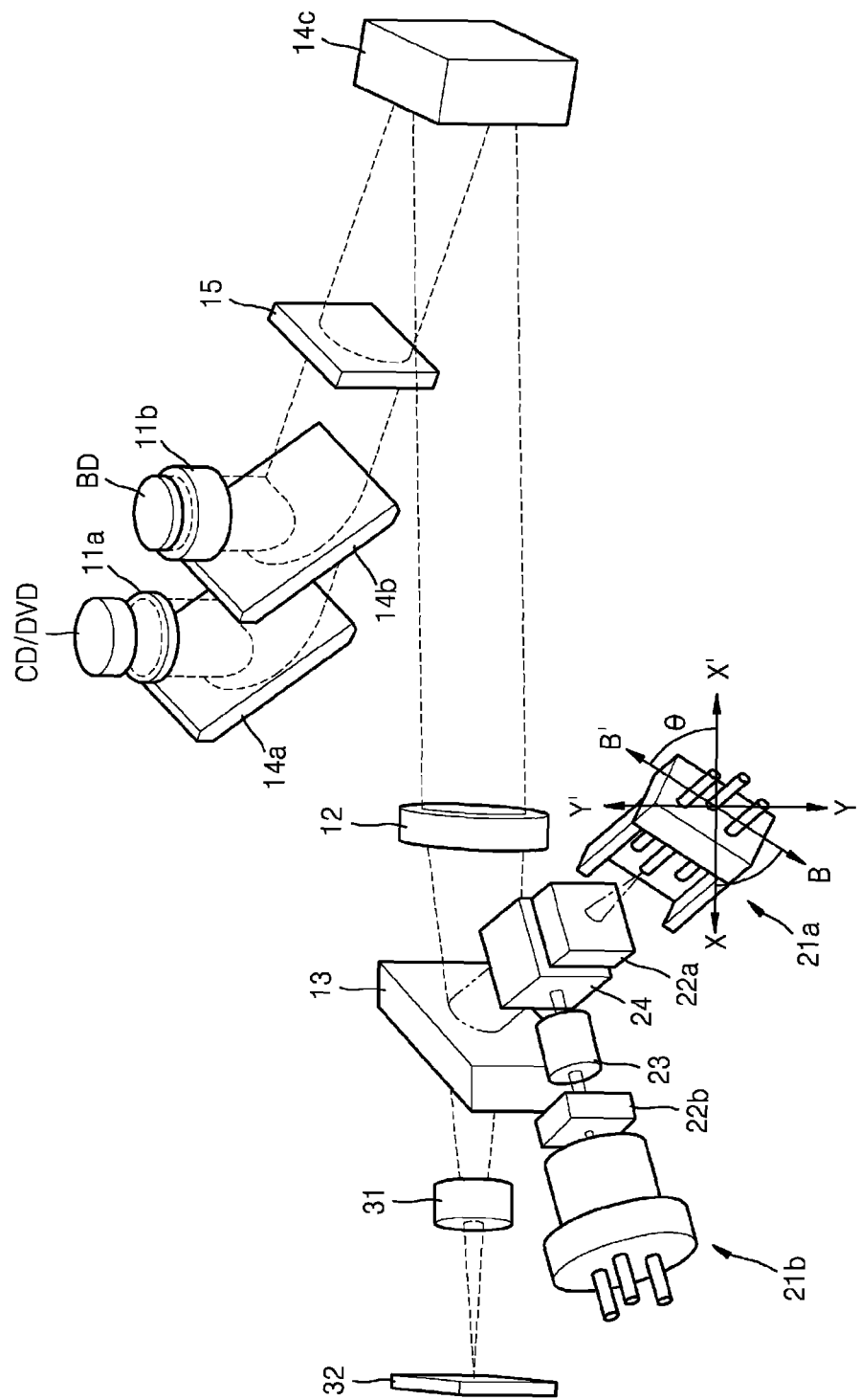
FIG. 5 is an exploded perspective view illustrating an example of the optical pickup device of FIG. 4.

FIG. 4 illustrates a schematic view of another example of an optical pickup device compatible with a plurality of media such as a CD, a DVD, and a BD. FIG. 5 illustrates an exploded perspective view of a structure of the example of the optical pickup device of FIG. 4.

A total reflection mirror 14a and a dichroic mirror 14b are respectively disposed under the objective lens 11a corresponding to CDs and DVDs and the objective lens 11b corresponding to BDs. The dichroic mirror 14b is disposed under the objective lens 11b for BDs to reflect blue light to a BD and transmit light for a CD or a DVD, that is, light having a longer wavelength. The total reflection mirror 14a for reflecting incident light to a CD or a DVD is disposed under the objective lens 11a for CDs and DVDs. The collimating lens 12, an optical path refracting mirror 14c, and a quarter-wave plate (QWP) 15 are disposed between the first beam splitter 13 and the dichroic mirror 14b.

As described in the examples above, the first beam splitter 13 transmits light reflected from the disc 1 to the photodetector 32 and reflects light from the first and second light sources 21a and 21b of the light source system 20 to the collimating lens 12.

In the light-receiving system 30, the sensing lens 31, which allows light reflected from the disc 1 to be incident as a spot with an appropriate size on the photodetector 32, is a semi-cylindrical lens having an infinite focus in a first direction, and a finite focus in a second direction perpendicular to the first direction.

The light source system 20 includes a plurality of light sources corresponding to a plurality of media as described above. For example, the light source system 20 includes the first light source 21a for CDs and DVDs and the second light source 21b for BDs. Here, the first light source 21a has a cylindrical body for emitting short wavelength light. However, the first light source 21a is a twin light source in which a chip for CDs and a chip for DVDs are integrated and has a base similar to a rectangle. In a half height (H/H) type optical pickup device that is not required to be slimmed, the first light source 21a may have a cylindrical base like the second light source 21b. In a slim optical pickup device, light sources should be slimmed to reduce a size of the optical pickup device. The first light source 21a is inclined with respect to a reference axis X-X', that is, a planar direction of the disc 1.

In FIG. 5, a diagonal of the base is aligned along a reference axis Y-Y' perpendicular to the reference axis X-X'. More generally, an arbitrary line passing through the chip for CDs and the chip for DVDs (a planar direction of a wafer on which light-emitting chips are formed) is inclined with respect to the reference axis X-X'. Such an inclination allows a long axis of 3 beams having oval shapes to be aligned in a radial direction of the disc 1, that is, in a direction crossing a direction in which a track extends. Accordingly, a diagonal of the base should be inclined with respect to the reference axis X-X'. Due to the inclination, a main beam may be inclined with respect to a tangential direction parallel to a track and the radial direction directed toward a center of the disc 1.

In general, there are different types of beam spots, for example, a radial orientation spot (ROS) type, a diagonal orientation spot (DOS) type, and a tangential orientation spot (TOS) type. Beams spots have different types according to directions of long axes thereof.

Figure 6:
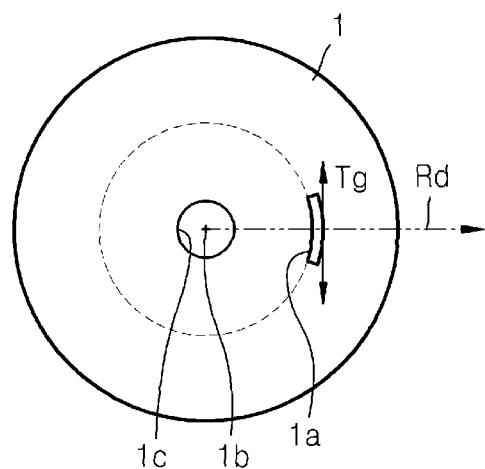
FIG. 6 is a plan view illustrating examples of a radial direction and a tangential direction with respect to a track of an optical disc.

The disc 1 includes a spindle hole 1c in which a rotation center 1b is located and a track T having a spiral shape is located on an information recording surface around the spindle hole 1c as shown in FIG. 6.

Figure 7A:
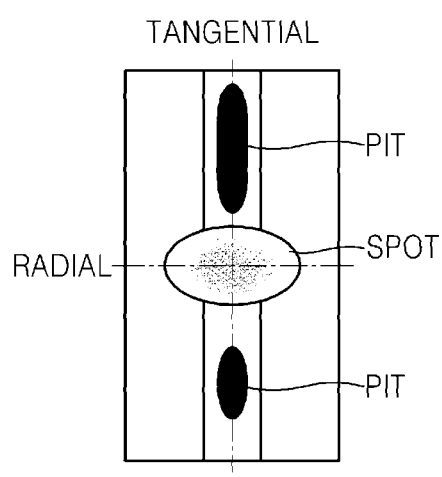
FIGS. 7A through 7C are diagrams illustrating examples of directions of beam spots having oval shapes formed on a track of a disc.
Figure 7B:
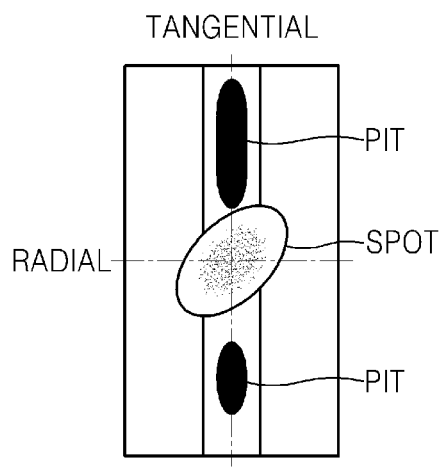
Figure 7C:
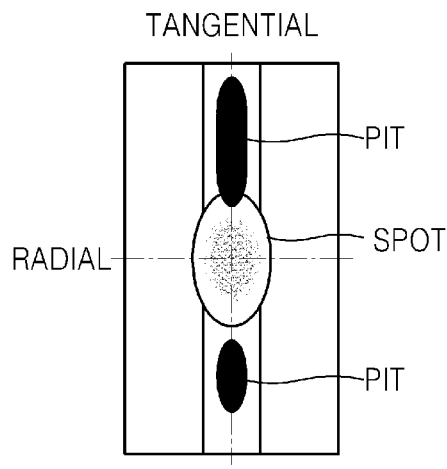

As shown in the example of FIG. 7A, if a beam spot is an ROS type, a long axis of the beam spot on a track 1a extends in a radial direction Rd. As shown in FIG. 7B, if a beam spot is a DOS type, a long axis of the beam spot is inclined with respect to a radial direction Rd and a tangential direction Tg. As shown in FIG. 7C, if a beam spot is a TOS type, a long axis of the beam spot extends in a tangential direction Tg.

Figure 8A:
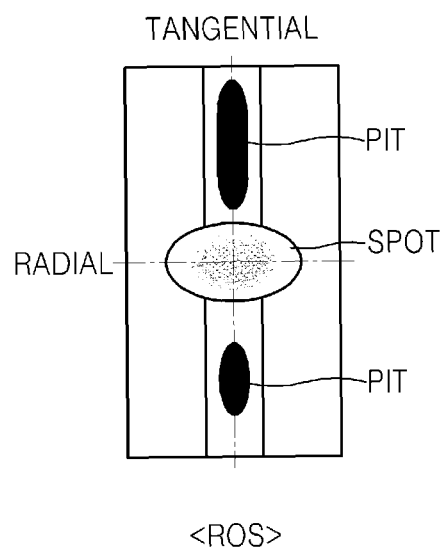
FIGS. 8A and 8B are diagrams illustrating examples of arrangements of beam spots.
Figure 8B:
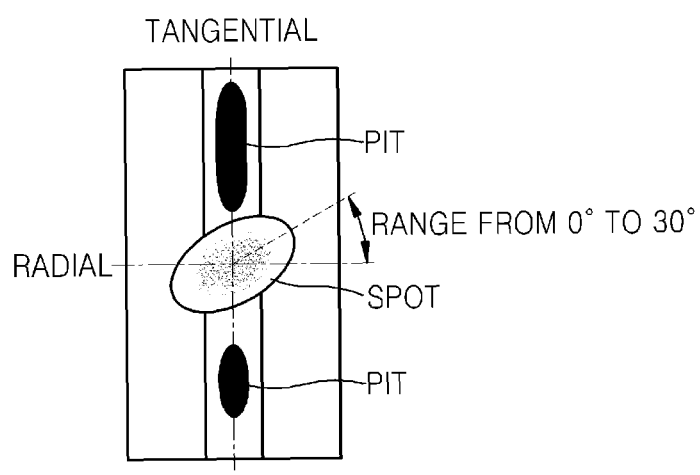

FIGS. 8A and 8B illustrate arrangements of beam spots according to examples described above. The beam spots are respectively arranged as ROS and DOS types in FIGS. 8A and 8B. In FIGS. 8A and 8B, long axes of the beam spots are inclined at angles ranging from about 0° to about 30°. If a beam spot is an ROS type, the beam spot is mainly applied to an optical pickup device for 9.5 mm drives, and enables interference between pits in a tangential direction to be reduced or minimized. Considering a skew effect due to interference between adjacent tracks in a radial direction, if the disc 1 is a DVD, in order for a size of a beam spot to be less than 1 μm in the radial direction, a magnification ratio of light transmission Mr should range from 5.5 to 6.5. If the disc 1 is a BD, a magnification ratio of light transmission Mr should range from 9 to 12.

$$Mr=fc/fo \quad \text{[Equation 2]}$$

where fc refers to a focal length of the collimating lens 12 and fo refers to a focal length of the first or second objective lens 11a or 11b.

If a beam spot is a DOS type, interference between pits and between adjacent tracks is limited or prevented better when an inclination ranges from 0° to 30° than when an inclination is greater than 30°.

Figure 9:
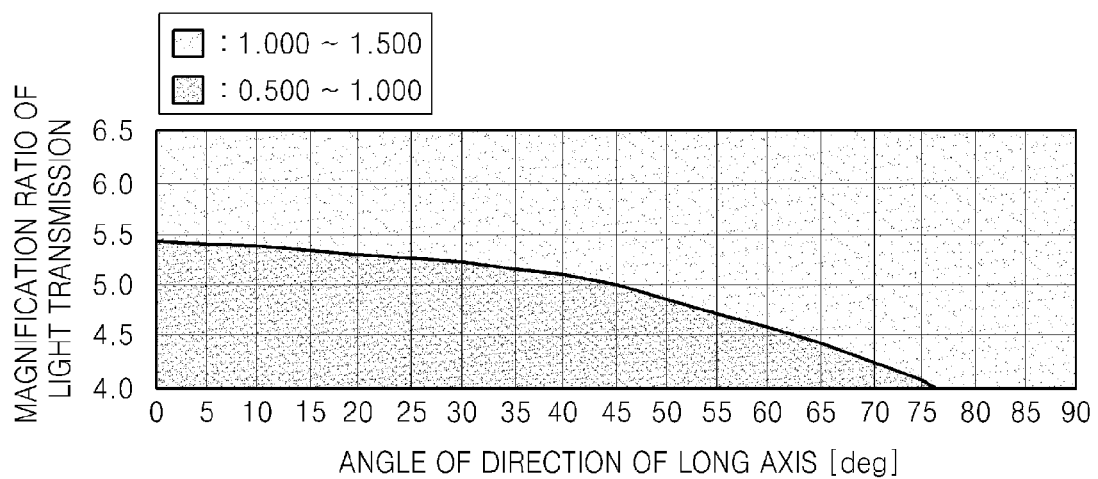
FIG. 9 is a graph illustrating an example of a distribution of a size of a beam spot according to a direction of a long axis of a beam spot and a magnification ratio of light transmission.

As an inclination increases, interference between pits increases. In order to reproduce high quality information, if the optical pickup device is designed such that a long axis of a beam spot extends in a tangential direction and a size of the beam spot is equal to or less than 1 μm in the tangential direction, for example, in the case of a DVD, a size of the beam spot ranges from 0.8 to 1 μm, satisfying recording and reproduction characteristics may be achieved. FIG. 9 illustrates a distribution (change) of a size of a beam spot according to an angle of a direction of a long axis and a magnification ratio of light transmission. In FIG. 9, a dark area is an area having a size of a beam spot of 1 to 1.5 μm, and a bright area is an area having a size of a beam spot of 0.500 to 1.000 μm.

In FIG. 9, an optimal low angle range is 0° to 30°. In this case, a size of a beam spot ranges from 0.500 to 1.000 μm and a magnification ratio of light transmission is equal to or greater than 5.5.

Table 1 shows a modulation transfer function (MTF) and a jitter according to an angle of a long axis of a beam spot obtained from a simulation. The simulation was performed on the assumption that the disc 1 is a DVD and a magnification ratio of light transmission is 5.5.

TABLE 1

| Type | Angle of Spot [deg] | MTF [3T/14T] | Jitter [%] | Remark |
|---|---|---|---|---|
| ROS | 0° | 24.87% | 7.20% | Good |
| DOS | 5° | 24.87% | 7.20% | |
| | 10° | 24.77% | 7.23% | |
| | 15° | 24.59% | 7.27% | |
| | 20° | 24.32% | 7.28% | |
| | 25° | 23.98% | 7.29% | |
| | Less than 30° | 23.67% | 7.50% | |
| | 30° | 23.59% | 7.59% | Bad |
| | 35° | 23.14% | 7.66% | |
| | 40° | 22.67% | 7.92% | |
| | 45° | 22.18% | 8.24% | |
| | 50° | 21.69% | 8.75% | |
| | 55° | 21.19% | 9.19% | |
| | 60° | 20.70% | 9.76% | |
| | 65° | 20.26% | 10.16% | |

In the simulation, better results are obtained for angles in a range less than 30° than for angles in a range equal to or greater than 30°. As a result, if a size of a beam spot in a tangential direction and a radial direction is equal to or less than 1 μm, a high quality reproduction signal may be obtained when the beam size has an angle ranging from 0° to 30°

Figure 10:
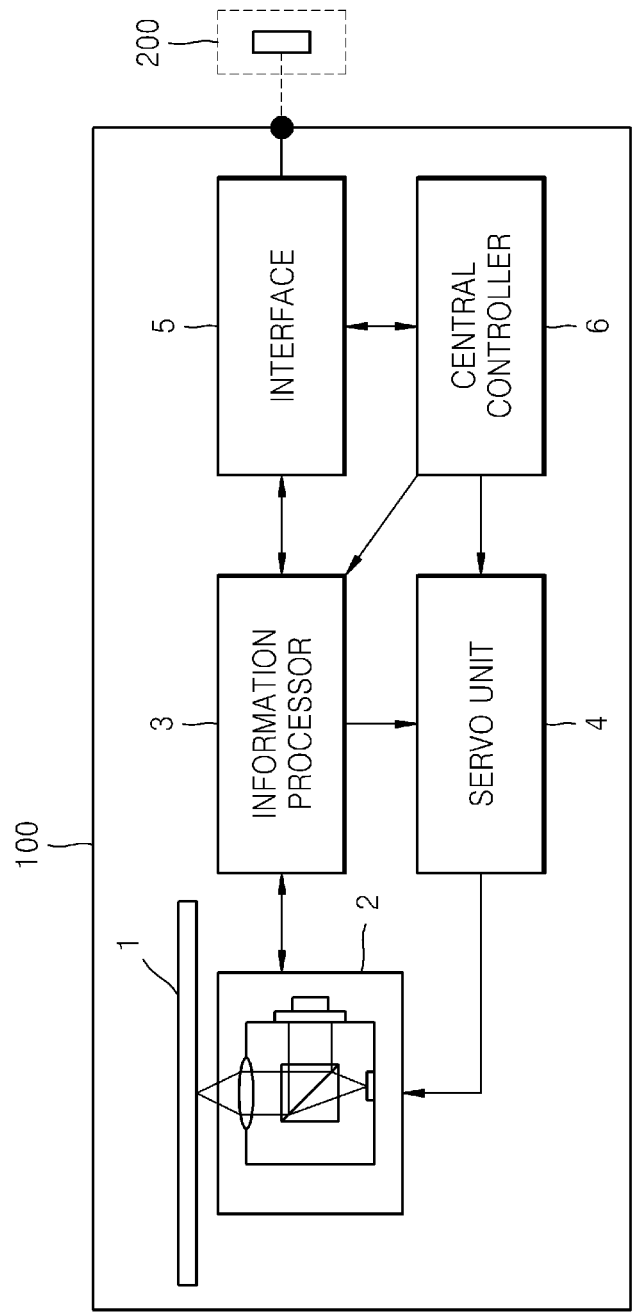
FIG. 10 is a diagram illustrating an example of an optical drive using an optical pickup device.

FIG. 10 illustrates an example of an optical drive 100 using an optical pickup device.

The optical drive 100 for reading or writing information from or to the disc 1 includes an optical pickup 2 according to the above one or more examples. The optical pickup 2 includes an optical system as described in the examples above and a mechanical system that mechanically supports the optical system and performs focusing and tracking operations. The optical system includes an encoder and a decoder, and is connected to an information processor 3 connected to an interface 5 to be connected to an external host. The mechanical system is connected to a servo unit 4. The information processor 3, the servo unit 4, and the interface 5 are controlled by a central controller 6. The interface 5 following various standards includes, for example, a universal serial bus (USB) port, and thus is connected to a host, e.g., a computer 200, by a USB protocol to receive and transmit information.

In the examples above, a laser diode for BDs and a laser diode for DVDs may be used as the light source.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup device comprising:
an optical system comprising a light source;
a light-receiving system configured to receive light reflected from a disc to generate an electrical signal; and
a light-transmitting system comprising an objective lens facing the disc and a collimating lens disposed behind the objective lens, and is configured to guide light emitted from the light source to the disc and guide light reflected from the disc to the light-receiving system, wherein:
the light source forms a beam spot having an oval shape with a long axis and a short axis on an information recording track of the disc, and the light source is disposed such that the long axis is maintained at an angle ranging from 0° to 30° with respect to a radial direction passing through a rotation center of the disc, and
when a magnification ratio Mr of light transmission is defined as:

$$Mr=fc/fo,$$

where fc is a focal length of the collimating lens and fo is a focal length of the objective lens, the magnification ratio Mr of light transmission corresponding to a digital versatile disc (DVD) ranges from 5.5 to 6.5 and the magnification ratio Mr of light transmission corresponding to a Blu-ray disc (BD) ranges from 9 to 12.

2. The optical pickup device of claim 1, wherein sizes of the beam spot formed on the disc in the radial direction and a tangential direction range from 0.500 to 1.00 μm.

3. The optical pickup device of claim 1, wherein the optical system comprises
a coupling lens disposed between an origin of the light corresponding to the BD and the collimating lens.

4. The optical pickup device of claim 2, wherein the optical system comprises
a coupling lens disposed between an origin of the light corresponding to the BD and the collimating lens.

5. An optical drive comprising:
an optical pickup device comprising:
an optical system comprising a light source;
a light-receiving system configured to receive light reflected from a disc to generate an electrical signal;

a light-transmitting system comprising an objective lens facing the disc and a collimating lens disposed behind the objective lens, and is configured to guide light emitted from the light source to the disc and guide light reflected from the disc to the light-receiving system;

a mechanical system configured to support the optical pickup device; and an information processor configured to process the electrical signal from the optical pickup device, wherein:

the light source forms a beam spot having an oval shape with a long axis and a short axis on an information recording track of the disc, and the light source is disposed such that the long axis is maintained at an angle ranging from 0° to 30° with respect to a radial direction passing through a rotation center of the disc, and when a magnification ratio Mr of light transmission is defined as:

$$Mr = fc/fo,$$

where fc is a focal length of the collimating lens and fo is a focal length of the objective lens, the magnification ratio Mr of light transmission corresponding to a digital versatile disc (DVD) ranges from 5.5 to 6.5 and the magnification ratio Mr of light transmission corresponding to a Blu-ray disc (BD) ranges from 9 to 12.

6. The optical drive of claim 5, wherein sizes of the beam spot formed on the disc in the radial direction and a tangential direction range from 0.500 to 1.00 μm.

7. The optical drive of claim 5, wherein the optical system comprises a coupling lens disposed between an origin of the light corresponding to the BD and the collimating lens.

8. The optical drive of claim 6, wherein the optical system comprises a coupling lens disposed between an origin of the light corresponding to the BD and the collimating lens.

9. A method of forming a beam spot, the method comprising:

transmitting a light beam generated by a light source through a collimating lens so as to produce a collimated light beam;

focusing, with an objective lens, the collimated light beam on a disc so as to create a beam spot on the disc having an oval shape with a long axis and a short axis, wherein:

the long axis is maintained at an angle ranging from 0° to 30° with respect to a radial direction passing through a rotation center of the disc, and when a magnification ratio Mr of light transmission is defined as:

$$Mr = fc/fo,$$

where fc is a focal length of the collimating lens and fo is a focal length of the objective lens, the magnification ratio Mr for the transmission of light corresponding to a digital versatile disc (DVD) ranges from 5.5 to 6.5 and the magnification ratio Mr for the transmission of light corresponding to a Blu-ray disc (BD) ranges from 9 to 12.

10. The method of claim 9, wherein sizes of the beam spot formed on the disc in the radial direction and a tangential direction range from 0.500 to 1.00 μm.

11. The method of claim 9, wherein a coupling lens is disposed between an origin of the light corresponding to the BD and the disc and reduces an optical distance between the origin of the light corresponding to the BD and the disc.

* * * * *